United States Patent [19]

Peytavy et al.

[11] Patent Number: 5,366,709
[45] Date of Patent: * Nov. 22, 1994

[54] LIQUID ABSORBENT FOR ACIDIC GASES AND PROCESS OF DEACIDIFICATION OF A GAS

[75] Inventors: Jean-Louis Peytavy; Philippe Le Coz; Olivier Oliveau, all of Lescar, France

[73] Assignee: Societe Nationale Elf Aquitaine Production, Paris, France

[*] Notice: The portion of the term of this patent subsequent to May 11, 2010 has been disclaimed.

[21] Appl. No.: 917,758

[22] Filed: Jul. 21, 1992

Related U.S. Application Data

[63] Continuation-in-part of Ser. No. 460,958, Jan. 18, 1990, Pat. No. 5,209,914.

[51] Int. Cl.$^5$ .......................... C01B 31/20; C09K 3/00
[52] U.S. Cl. .................................... 423/228; 252/189; 423/229
[58] Field of Search ................. 423/228, 229; 252/189

[56] References Cited

U.S. PATENT DOCUMENTS

| | | |
|---|---|---|
| 3,535,260 | 10/1970 | Singh . |
| 3,662,267 | 11/1971 | Heidelberg et al. . |
| 4,100,257 | 7/1978 | Sartori et al. . |
| 4,101,633 | 7/1978 | Sartori et al. . |
| 4,112,051 | 9/1978 | Sartori et al. . |
| 4,112,052 | 9/1978 | Sartori et al. . |
| 4,336,233 | 6/1982 | Appl et al. ...................... 252/189 |
| 4,368,059 | 1/1983 | Doerges et al. . |
| 4,376,102 | 3/1983 | Thaler et al. . |
| 4,537,753 | 8/1985 | Wagner et al. ................. 423/229 |
| 4,814,104 | 3/1989 | Kubek et al. .................... 252/189 |
| 4,840,777 | 6/1989 | Faucher . |
| 4,997,630 | 3/1991 | Wagner et al. ................. 423/228 |
| 5,246,619 | 9/1993 | Niswander ....................... 423/228 |

FOREIGN PATENT DOCUMENTS

| | | |
|---|---|---|
| 7807692 | 1/1979 | Netherlands . |
| 2001338 | 7/1978 | United Kingdom . |
| 2001338 | 1/1979 | United Kingdom . |

OTHER PUBLICATIONS

PCT published application WO89/11327, published Nov. 30, 1989.

Primary Examiner—Wayne Langel
Attorney, Agent, or Firm—Weiser & Associates

[57] ABSTRACT

An absorbent liquid having an improved absorption capacity for acidic gaseous compounds due to the presence of an activator of tertiary alkanolamines. The activator is butylmonoethanolamine (BMEA). A process utilizing the absorbent liquid to remove acidic gaseous compounds from a gas.

24 Claims, No Drawings

LIQUID ABSORBENT FOR ACIDIC GASES AND PROCESS OF DEACIDIFICATION OF A GAS

CROSS REFERENCE TO RELATED APPLICATIONS

This application is a continuation-in-part of U.S. patent application Ser. No. 7,460,958, filed Jan. 18, 1990, which is incorporated herein by reference now U.S. Pat No. 5,209,914 issued May 11, 1993.

BACKGROUND OF THE INVENTION

The invention relates to a liquid absorbent of acidic gaseous compounds containing a mixture of one or more tertiary alkanolamine components and an activator of the tertiary alkanolamine(s). It also relates to a process of utilizing the absorbent liquid to deacidify gases containing $CO_2$ and other acidic gaseous compounds such as $H_2S$ and/or COS.

It is known that it is possible to rid gases of undesirable acidic gaseous compounds or acidic gases, especially $CO_2$, $H_2S$ and COS, which they contain by subjecting the gases to scrubbing by means of regenerable absorbent liquids. These liquids have contained organic solvents or aqueous solutions of organic solvents, which retain the acidic gaseous compounds. On an industrial scale, there are chiefly two categories of absorbent liquids employed for scrubbing gas containing acidic gaseous compounds. On the one hand, there are absorbent liquids with physical action, such as sulpholane, N-methylpyrrolidone, polyethylene glycol dimethyl ether, methanol or propylene carbonate, which absorb acidic gaseous compounds such as mentioned above without any chemical reaction. The major disadvantage, however, is that of simultaneously absorbing large quantities of hydrocarbons. On the other hand, there are absorbent liquids with predominant chemical action. Examples are aqueous solutions of alkanolamines such as monoethanolamine, diethanolamine, diglycolamine, diisopropanolamine, triethanolamine or methyldiethanolamine, which fix acidic gaseous compounds such as $CO_2$, $H_2S$ and COS. A chemical reaction proceeds forming compounds which are capable of being decomposed by heating. This allows the absorbent liquid to be regenerated. Primary alkanolamines such as monoethanolamine, or secondary alkanolamines such as diethanolamine are generally suitable for highly exhaustive removal of $CO_2$. However, these amines have the disadvantage of requiring a large expenditure of energy for regeneration.

With tertiary alkanolamines, especially methyldiethanolamine (MDEA) and triethanolamine, the consumption of energy required for regeneration is lower. However, the treated gas resulting from the scrubbing operation using these tertiary alkanolamines still has $CO_2$ contents ranging from a few thousand ppm to as much as a few per cent. This is due to the fact that tertiary alkanolamines do not react directly with $CO_2$. The resultant kinetics of absorption of $CO_2$ by the absorbent liquid containing such tertiary alkanolamines are much slower than the kinetics of absorption of $CO_2$ by an absorbent liquid based on primary or secondary alkanolamines. The rate of absorption of $H_2S$ is substantially the same for whatever alkanolamine is employed in the absorbent liquid.

It has been disclosed in U.S. Ser. No. 07,460,958 that it is advantageous to add to an absorbent liquid containing a tertiary alkanolamine, a small activating amount of an activator for the tertiary amine.

Most noteworthy of these advantages is increased $CO_2$ absorption by the activated tertiary amine. As discussed above, tertiary alkanolamine-based absorbent liquids require less energy for regeneration. This energy saving is also retained during the regeneration of the absorbent liquid which additionally contains the activator.

It has been disclosed in U.S. Ser. No. 07,460,958 that four groups of amines are effective activators of $CO_2$ absorption by tertiary alkanolamines. One of these groups of activator amines is a secondary amine represented by the general formula: $R_1$—NH—$(C_pH_{2p})$—OH, wherein $R_1$ is a $C_2$-$C_6$ alkyl group and p is an integer ranging from about 1 to 6.

The alkyl group can be straight or branched, such as ethyl, propyl, isopropyl, butyl, isobutyl, pentyl, isopentyl and hexyl. Typical amines are the following: propylmonoethanolamine, isopropylmonoethanolamine, butylmonoethanolamine, isobutylmonoethanolamine and pentylmonoethanolamine.

A particularly preferred amine disclosed in U.S. Ser. No. 07,460,958 within this generic formula is ethylmonoethanolamine (EMEA).

It has now been discovered that another amine within the generic formula above is unexpectedly superior to EMEA in activating $CO_2$ absorption by one or more tertiary alkanolamines such as MDEA. The amine is butylmonoethanolamine (BMEA).

BRIEF SUMMARY OF THE INVENTION

The present invention relates to an absorbent liquid composition of one or more tertiary alkanolamines and an activator amine of the tertiary amine(s) having improved absorption of acidic gases such as $CO_2$.

The activator amine of the present invention is BMEA.

The present invention also relates to a process which utilizes the absorbent liquid of the present invention to remove acidic gases, such as $CO_2$, from a gas stream using BMEA. The steps of the process comprise absorbing $CO_2$ from an acidic gas stream by contacting and scrubbing said gas with an absorbent liquid of one or more tertiary alkanolamines and BMEA, which acts as an activator of $CO_2$ absorption by the tertiary amine, and regenerating the $CO_2$-ladened absorbent liquid for further contacting with and absorption of $CO_2$ from the gas stream.

DETAILED DESCRIPTION OF THE INVENTION

There is herein disclosed a particular embodiment of the invention with the understanding that the following description is to be considered as exemplary of the principles of the invention and is not intended to limit the scope of the invention as determined by the appended claims and equivalent subject matter.

The present invention provides a liquid absorbent composition for absorption of acidic gases, such as $CO_2$, from a gas stream. The liquid absorbent is one or more tertiary alkanolamines and an activator of the tertiary amine(s), which is present in an activating amount. The activator of the invention is BMEA.

The concentration of the tertiary alkanolamine in the absorbent liquid may be between about 1N and about 6N. Preferably, the concentration is between about 2.5N and about 5N.

The activating amount of the activator BMEA in the absorbent liquid can vary quite widely. The amount is such that the ratio of moles of BMEA to moles of BMEA and tertiary alkanolamine is between about 0.01 and about 0.5. Preferably, the above ratio is from about 0.05 to about 0.25.

The absorbent liquid, according to the invention, is generally in the form of an aqueous solution of the tertiary alkanolamine and BMEA. Where appropriate, the aqueous solution may also contain a minor amount of one or more water-soluble organic solvents for the acidic gases, especially sulpholane, methanol or N-methylpyrrolidone.

The activating molar amount of BMEA of the present invention in the absorbent liquid is between about 0.05 mole/liter to about 2 moles/liter. The preferred concentration of BMEA is about 0.1 mole/liter to about 1 mole/liter.

The tertiary alkanolamines which are suitable for the absorbent liquid may be chosen from the various tertiary alkanolamines which are water-soluble in the concentrations employed. Non-limiting examples of these tertiary alkanolamines are N-methyldiethanolamine, triethanolamine, N-ethyldiethanolamine, 2-dimethylaminoethanol, 2-dimethylamino-1-propanol, 3-dimethylamino-1-propanol, 1-dimethylaminoethanol-2-propanol, N-methyl-N-ethyl-ethanolamine, 2diethylaminoethanol, 3-dimethylamino-1-butanol, 3-dimethylamino-2-butanol, N-methyl-N-isopropyl-ethanolamine, N-methyl-N-ethyl-3-amino-1-propanol, 4-dimethylamino-1-butanol, 4-dimethylamino-2-butanol, 3-dimethylamino-2-methyl-1-propanol, 1-dimethylamino-2-methyl-2-propanol, 2-dimethylamino-1-butanol and 2-dimethylamino-2-methyl-1-propanol. The preferred tertiary alkanolamines include methyldiethanolamine, triethanolamine, 2-dimethylaminoethanol, 3-dimethylamino-1-propanol and 1-diethylamino-2-propanol.

Other tertiary alkanolamines disclosed in the prior art can also benefit by the addition of the activator BMEA. See U.S. Pat. Nos. 3,535,260, 4,101,633 and 4,336,233, which are incorporated herein by reference.

The present invention is also directed to a process which utilizes the absorbent liquid to remove acidic gases, such as $CO_2$, from a gas stream.

The absorbent liquid according to the invention can be employed for performing the scrubbing of various gases containing $CO_2$ and possibly other acidic gaseous compounds such as $H_2S$ and COS.

The acidic gases to be treated may be synthesis gases, gases originating from coal gasification, coke oven gases, refinery gases or natural gases. Their total content of acidic gaseous compounds may range from a few tenths of a percent to tens of percent by volume.

The steps of the process comprise absorbing $CO_2$ from an acidic gas stream by contacting and scrubbing said gas with an absorbent liquid of one or more tertiary alkanolamines and BMEA, which acts as an activator of $CO_2$ absorption by the tertiary amine, and regenerating the $CO_2$-ladened absorbent liquid for further contacting with and absorption of $CO_2$ from the gas stream.

The process of scrubbing the gas containing $CO_2$, and, if necessary, the other acidic gaseous compounds to be removed such as $H_2S$ and COS, generally comprises an absorption stage. During this stage, the gas to be treated and the absorbent liquid are contacted with each other, preferably countercurrentwise, in an absorption zone under suitable conditions to produce a treated gas with a reduced content of gaseous compounds. The gaseous content generally corresponds to that of the specifications provided for the treated gas. The absorbent liquid charged with $CO_2$ and other possible acidic gaseous compounds is then subjected to a regeneration treatment under suitable conditions to release the acidic gaseous compounds absorbed by the liquid. Thus, there is produced, on the one hand, at least one acidic gaseous fraction containing the released acidic gaseous compounds and, on the other hand, a regenerated absorbent liquid which is recycled towards the absorption zone.

The regeneration of the absorbent liquid charged with $CO_2$ and other possible acidic gaseous compounds, especially $H_2S$ and/or COS, is advantageously carried out by decompression. The decompression of at least a part of the charged absorbent liquid is carried out in one or more stages, which is reflected in a substantial saving in the energy required for the regeneration of the absorbent liquid.

According to one embodiment of the regeneration, all of the charged absorbent liquid is decompressed in one or more stages to release most of the $CO_2$ present in the charged absorbent liquid. The decompressed absorbent liquid is then subjected to a complementary regeneration by steam stripping by direct or indirect heating of the absorbent liquid. The absorbent liquid resulting from the complementary regeneration is recycled into the absorption zone and especially into the upper part of said zone. In an alternative form of this embodiment, only a part of the decompressed absorbent liquid is subjected to complementary regeneration by stripping. The absorbent liquid resulting from the complementary regeneration is recycled into the upper part of the absorption zone. The part of the decompressed absorbent liquid which is not subjected to the complementary regeneration is recycled into the absorption zone at a point which is situated below the point of recycling of the absorbent liquid regenerated by stripping.

According to another embodiment of the regeneration process, a fraction of the charged absorbent liquid is decompressed to release most of the $CO_2$ which it contains. The remaining fraction of the charged absorbent liquid is subjected directly to a regeneration by steam stripping by direct or indirect heating. The steam-stripped fraction of the absorbent liquid is recycled into the upper part of the absorption zone, while the decompressed fraction of absorbent liquid is recycled into the absorption zone below the point of recycling of the steam-stripped absorbent liquid.

If need be, the charged absorbent liquid exiting the absorption zone may be subjected to a preliminary decompression to release nonacidic gases such as the hydrocarbons retained by the absorbent liquid. The actual regeneration is then carried out.

The absorption and regeneration stages described above can be implemented in any suitable apparatus which makes it possible to carry out deacidification of a gas by means of a regenerable absorbent liquid, and in particular in those apparatuses which make it possible to perform at least partial regeneration of the charged absorbent liquid by decompression. This can be supplemented by a regeneration using stripping. Apparatuses similar to those which are disclosed in U.S. Pat. Nos. 3,622,267 and 4,336,233 are particularly suitable.

The operating conditions for implementing the abovementioned absorption and regeneration stages, especially temperature, pressure, gas flow rate and the flow rate of absorbent liquid, are those recommended for the gas deacidification processes employing absorbent liquids based on alkanolamines. For example, the absorption stage, during which the gas to be treated is scrubbed with the absorbent liquid of the present invention, can be implemented at temperatures of between about 10° C. and about 100° C. and more particularly between about 30° C. and about 60° C. The pressures can be between about 1.5 and about 100 bars absolute. Regeneration by decompression is also carried out at the temperature of the charged absorbent liquid to be decompressed. The pressures reached after each decompression are between the pressure of the charged absorbent liquid drawn off from the absorption zone and approximately 1.5 bars absolute, and decreased from one decompression to the next when several successive decompressions are performed. Regeneration by stripping is carried out in a conventional manner by subjecting the charged absorbent liquid to a reboiling operation in a stripping zone maintained overhead at a temperature of approximately between about 80° C. and about 150° C. and at a pressure below about 5 bars and in most cases between about 1.3 and about 2.5 bars absolute.

When the regeneration by decompression, in one or more stages, is followed by a complementary regeneration by stripping, the pressure of the decompressed absorbent liquid conveyed to the regeneration by stripping is chosen so as to be close to the overhead pressure of the stripping zone.

The following example further illustrates various features of the invention but is intended in no way to limit the scope of the invention.

EXAMPLE 1

A gas containing $CO_2$ is treated in accordance with the invention with a tertiary alkanolamine and the activator, butylmonoethanolamine (BMEA). This amine is also compared with methylmonoethanolamine (MMEA) (of the prior art) and ethylmonoethanolamine (EMEA) of the parent application.

Three series of comparison tests for $CO_2$ absorption were carried out using aqueous absorbent liquids of the tertiary alkanolamine MDEA and of either BMEA, EMEA, or MMEA as an activator of the MDEA, respectively.

In each test, a gas containing $CO_2$ was scrubbed using the chosen absorbent liquid by operating in a column equipped overhead with an exit for the gases, in its upper part with an entry for the liquids, in its lower part with an entry for the gases, and at the bottom with an exit for the liquids. The internal space of the column, included between the entries for the liquids and for the gases, was provided with 12 uniformly spaced perforated trays.

A gas containing 40% of $CO_2$ and 60% of methane by volume was injected at a flow rate of 600 Nl/hr. via the gas entry of the column, and the chosen absorbent liquid was introduced at a flow rate of 31 /hr. via the liquid entry of the column. A $CO_2$-depleted gas was discharged from the head of the column and a $CO_2$-charged absorbent liquid was drawn off at the bottom of the column.

The values of the absolute pressure and of the overhead temperature of the column were 2.2 bars and 50° C. respectively.

The gases entering and existing the column were analyzed by gas phase chromatography to determine their $CO_2$ content. The amount of $CO_2$ absorbed by the absorbent liquid was determined from these chromatographic measurements.

The efficiency of the absorption of $CO_2$ by the absorbent liquid containing the respective activators was defined as the "relative $CO_2$ absorption", which represents the ratio of the molar percentage of $CO_2$ absorbed by the MDEA solution containing an activator of BMEA, EMEA or MMEA to the molar percentage of $CO_2$ absorbed by the MDEA solution without activator.

These tests determined that an absorbent liquid composition containing the activator BMEA absorbed more $CO_2$ than the compositions containing the activators EMEA or MMEA.

The results of these tests are shown in Table I hereinafter.

TABLE 1
COMPOSITION OF THE AQUEOUS ABSORBENT LIQUID

| MDEA (moles/l) | Activator Type | Concentration (moles/l) | Residual $CO_2$ (g/l) in the Absorbent Liquid | Relative $CO_2$ Absorption | % Improvement Over MMEA |
|---|---|---|---|---|---|
| 4 | — | — | — | 1 ($\alpha$) | — |
| 3.5 | MMEA | 0.5 | — | 1.75 | — |
| 3.5 | EMEA | 0.5 | — | 1.95 | 11 |
| 3.5 | BMEA | 0.5 | — | 2.10 | 20 |
| 4 | — | — | 20 | 1 ($\beta$) | — |
| 3.5 | MMEA | 0.5 | 20 | 1.60 | — |
| 3.5 | EMEA | 0.5 | 20 | 1.90 | 19 |
| 3.5 | BMEA | 0.5 | 20 | 1.98 | 22 |
| 4 | — | — | 40 | 1 ($\gamma$) | |
| 3.5 | MMEA | 0.5 | 40 | 1.50 | — |
| 3.5 | EMEA | 0.5 | 40 | 1.85 | 23 |
| 3.5 | BMEA | 0.5 | 40 | 1.92 | 28 |

($\alpha$): 37.5% of the initial $CO_2$ was absorbed
($\beta$): 29% of the initial $CO_2$ was absorbed
($\gamma$): 22% of the initial $CO_2$ was absorbed The data of Table 1 establishes that the activator BMEA of the present invention is superior compared to EMEA (parent application), which is superior to MMEA (prior art) in activating improved $CO_2$ absorption from a gas by a tertiary amine-based absorbent liquid, in this instance, MDEA.

It was unexpected that EMEA was found to be more efficient in activating $CO_2$ absorption by a tertiary alkanolamine than the lower homologue MMEA (of the prior art), and further that the BMEA of the present application was a more efficient activator than the EMEA of the parent application.

Further, the expected molar loss/hr. of the activators BMEA, EMEA and MMEA was computed.

The calculations were determined for a gas which contains 15% $H_2S$ and 10% $CO_2$ by volume with a flow rate of 125,000 $Nm^3$ /hr.; the absorbent liquid is in an absorption zone having a head temperature of 60° C.

Four-fold less moles of BMEA was computed would be lost as compared with EMEA (parent application) and seven-fold less BMEA lost as compared with prior art MMEA.

It will be understood by those skilled in the art that the foregoing description and example are illustrative of practicing the present invention, but are in no way intended to be limiting. Variations of the details presented herein may be made without departing from the spirit and scope of the present invention.

We claim:

1. An absorbent liquid having an improved absorption capacity for $CO_2$ due to the presence of an activator in the liquid, said liquid comprising a mixture of a tertiary alkanolamine and an activating amount of the activator butylmonoethanolamine (BMEA), said activated tertiary amine having improved $CO_2$ absorption capacity.

2. The absorbent liquid of claim 1, wherein the concentration of the tertiary alkanolamine is about 1N to about 6N.

3. The absorbent liquid of claim 2, wherein the concentration is about 2.5N to about 5N.

4. The absorbent liquid of claim 1, wherein the ratio of moles of BMEA to moles of BMEA and tertiary alkanolamine is between about 0.01 to about 0.5.

5. The absorbent liquid of claim 4, wherein the ratio is between about 0.05 to about 0.25.

6. The absorbent liquid of claim 1, wherein the tertiary alkanolamine is selected from the group consisting of N-methyldiethanolamine, triethanolamine, 2-dimethylaminoethanol, 3-dimethylamino-1-propanol and 1-diethylamino-2-propanol.

7. The absorbent liquid of claim 6, wherein the tertiary alkanolamine is N-methyldiethanolamine.

8. The absorbent liquid of claim 1, wherein the activating amount of the BMEA is between about 0.05 mole/liter to about 2 moles/liter.

9. The absorbent liquid of claim 8, wherein the activating amount of the BMEA between about 0.1 mole/liter to about 1 mole/liter.

10. A process for improved $CO_2$ absorption from a gas by an absorbent liquid which has an improved absorption capacity for $CO_2$ due to the presence of an activator which process comprises contacting said gas and the absorbent liquid in an absorption zone having an upper and a lower part, thereby obtaining a treated gas with a reduced $CO_2$ content and an absorbent liquid with an increased $CO_2$ content, regenerating said absorbent liquid, thereby releasing $CO_2$ and producing at least one gaseous fraction containing the released $CO_2$ and a regenerated absorbent liquid and recycling said regenerated absorbent liquid to the absorption zone, the absorbent liquid comprising a mixture of a tertiary alkanolamine and an activating amount of the activator butylmonoethanolamine (BMEA), which activated tertiary amine exhibits improved $CO_2$ absorption from the gas.

11. The process of claim 10, wherein the gas further comprises another acidic gas selected from the group consisting of $H_2S$ and COS.

12. The process of claim 10, wherein the regeneration step comprises at least one decompression step of at least a part of the absorbent liquid with increased $CO_2$-content.

13. The process of claim 10, wherein the regeneration step comprises subjecting all of the absorbent liquid with an increased $CO_2$ content to at least one decompression step, thereby releasing essentially all of the $CO_2$ from said absorbent liquid, obtaining a decompressed absorbent liquid and subjecting the decompressed absorbent liquid to a complementary regeneration step which comprises steam-stripping said absorbent liquid by heating and recycling said steam-stripped absorbent liquid into the upper part of the absorption zone.

14. The process of claim 13, wherein part of the decompressed absorbent liquid is subjected to said complementary regeneration by steam-stripping, the steam-stripped absorbent liquid being recycled into the upper part of the absorption zone, while the part of the decompressed absorbent liquid which is not subjected to the complementary regeneration is recycled into the absorption zone below the steam-stripped absorbent liquid.

15. The process of claim 10, wherein the regeneration of the absorbent liquid comprises subjecting a fraction of said liquid to decompression in at least one stage, thereby releasing essentially all of the $CO_2$, while the remaining fraction of the absorbent liquid is subjected directly to steam-stripping regeneration by heating, and recycling the steam-stripped fraction into the upper part of the absorption zone, while recycling the decompressed fraction into the absorption zone below the steam-stripped absorbent liquid.

16. The process of claim 14, wherein the steam-stripping is by direct-heating.

17. The process of claim 14, wherein the steam-stripping is by indirect-heating.

18. The process of claim 10, wherein the concentration of the tertiary alkanolamine is about 1N to about 6N.

19. The process of claim 18, wherein the concentration is about 2.5N to about 5N.

20. The process of claim 10, wherein the ratio of moles of BMEA to moles of BMEA and tertiary alkanolamine is between about 0.01 to about 0.5.

21. The process of claim 20, wherein the ratio is between about 0.05 to about 0.25.

22. The process of claim 10, wherein the absorbent liquid with the increased $CO_2$ content is subjected to a preliminary decompression to release nonacidic gases.

23. The process of claim 10, wherein the activating amount of the BMEA is between about 0.05 mole/liter to about 2 moles/liter.

24. The process of claim 23, wherein the activating amount of the BMEA is between about 0.1 mole/liter to about 1 mole/liter.

* * * * *